(12) United States Patent
Lin et al.

(10) Patent No.: US 10,366,185 B2
(45) Date of Patent: Jul. 30, 2019

(54) GENERATING A FLOW MODEL GRID BASED ON TRUNCATION ERROR THRESHOLD VALUES

(71) Applicant: Halliburton Energy Services, Inc., Houston, TX (US)

(72) Inventors: Avi Lin, Houston, TX (US); Dinesh Ananda Shetty, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1016 days.

(21) Appl. No.: 14/011,546

(22) Filed: Aug. 27, 2013

(65) Prior Publication Data

US 2015/0066447 A1    Mar. 5, 2015

(51) Int. Cl.
*G06F 17/50* (2006.01)

(52) U.S. Cl.
CPC ...... *G06F 17/5018* (2013.01); *G06F 17/5009* (2013.01); *G06F 2217/16* (2013.01)

(58) Field of Classification Search
None
See application file for complete search history.

(56) References Cited

U.S. PATENT DOCUMENTS

| 6,052,520 | A | 4/2000 | Watts, III |
| 2008/0133186 | A1 | 6/2008 | Li et al. |
| 2008/0312880 | A1 | 12/2008 | McLuckie |
| 2010/0204972 | A1 | 8/2010 | Hsu et al. |
| 2010/0307755 | A1 | 12/2010 | Xu et al. |
| 2011/0029291 | A1 | 2/2011 | Weng et al. |
| 2013/0346042 | A1* | 12/2013 | Shen ...................... G01V 3/083 703/2 |

FOREIGN PATENT DOCUMENTS

WO    WO2012115628    8/2012

OTHER PUBLICATIONS

Russel et al., Analytical tracking along streamlines in temporally linear Raviart-Thomas velocity fields, Feb. 2000, University of Colorado, pp. 1-14.*
Sadarjoen et al., Deformable Surface Techniques for Field Visualization, 1997, Blackwell Publishers, vol. 16 No. 3, pp. 1-8.*
Khodier et al., "One-Dimensional Adaptive Grid Generation", Internat. J. Math. & Math. Sci., vol. 20, No. 3, 1997, pp. 577-584.

(Continued)

*Primary Examiner* — Aniss Chad
*Assistant Examiner* — Bernard E Cothran
(74) *Attorney, Agent, or Firm* — John W. Wustenberg; Parker Justiss, P.C.

(57) ABSTRACT

In some aspects, locations for nodes are computed for a one-dimensional flow model that models well system fluid flow in a subterranean region. Truncation error threshold data indicate a truncation threshold value for each of the nodes. Discretization data indicate a lowest-order term truncated from a discretized governing flow equation for each of the nodes. The locations for the nodes can be computed based on a scalar cost function, such that each of the lowest order terms is less than or equal to the truncation error threshold value for the respective node.

15 Claims, 7 Drawing Sheets

(56) References Cited

OTHER PUBLICATIONS

Lassila, "Adaptive Mesh Generation Methods for Path Constrained Optimal Control," 2006, 20 pages.
Russell et al., "Adaptive Mesh Selection Strategies for Solving Boundary Value Problems", SIAM J. Numer. Anal. vol. 15, No. 1, Feb. 1978, pp. 59-80.
Yamaleev, "Minimization of the Truncation Error by Grid Adaptation", NASA/CR-1999-209729, ICASE Report No. 99-46, Nov. 1999, 36 pages.
U.S. Appl. No. 14/011,316, filed Aug. 27, 2013, entitled "Generating a Smooth Grid for Simulating Fluid Flow in a Well System Environment," inventors Lin et al.

\* cited by examiner

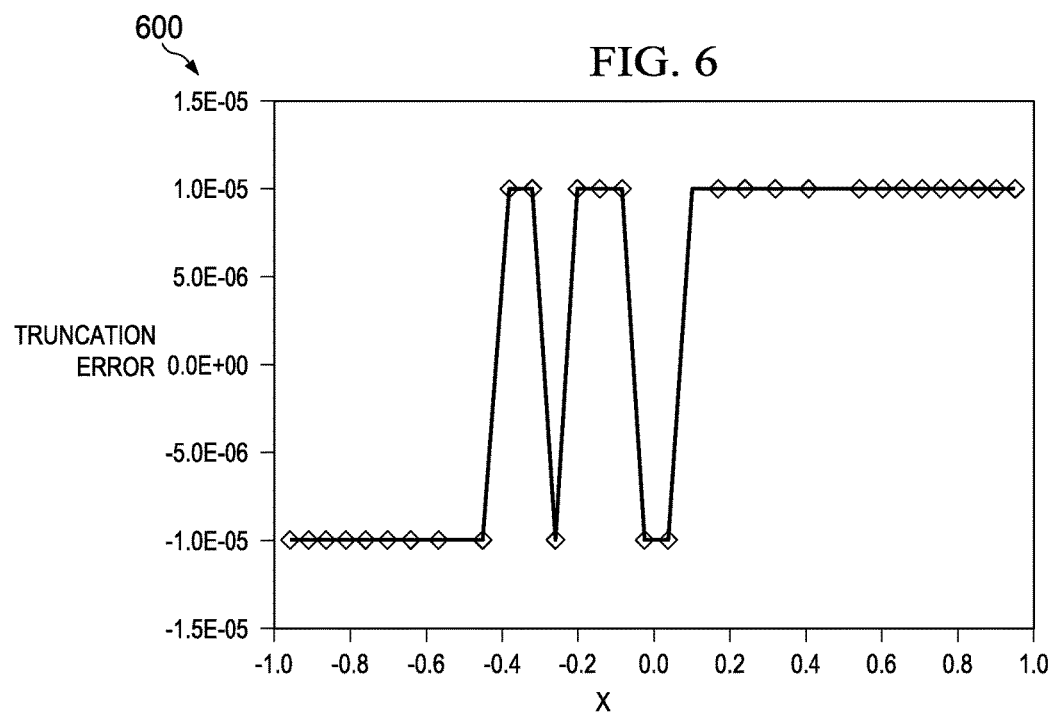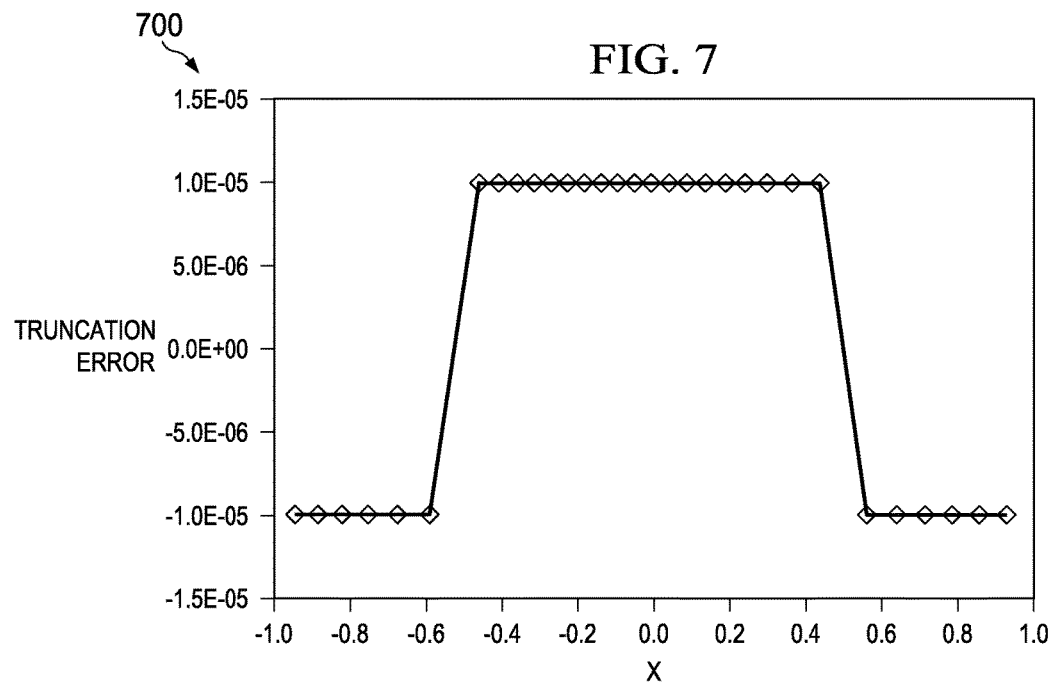

GENERATING A FLOW MODEL GRID BASED ON TRUNCATION ERROR THRESHOLD VALUES

BACKGROUND

The following description relates to generating nodes for use in fluid flow simulations, for example, in a simulation of well system fluid in a subterranean region.

Flow models have been used to simulate fluid flow in wellbores and other environments. A flow model can use a numerical technique such as a finite difference method for the simulation. A finite difference method can include a distribution of nodes over the simulation domain.

DESCRIPTION OF DRAWINGS

FIG. 6 is a plot showing an example truncation error distribution.

FIG. 7 is a plot showing an example truncation error distribution.

Like reference symbols in the various drawings indicate like elements.

DETAILED DESCRIPTION

Figure 1:
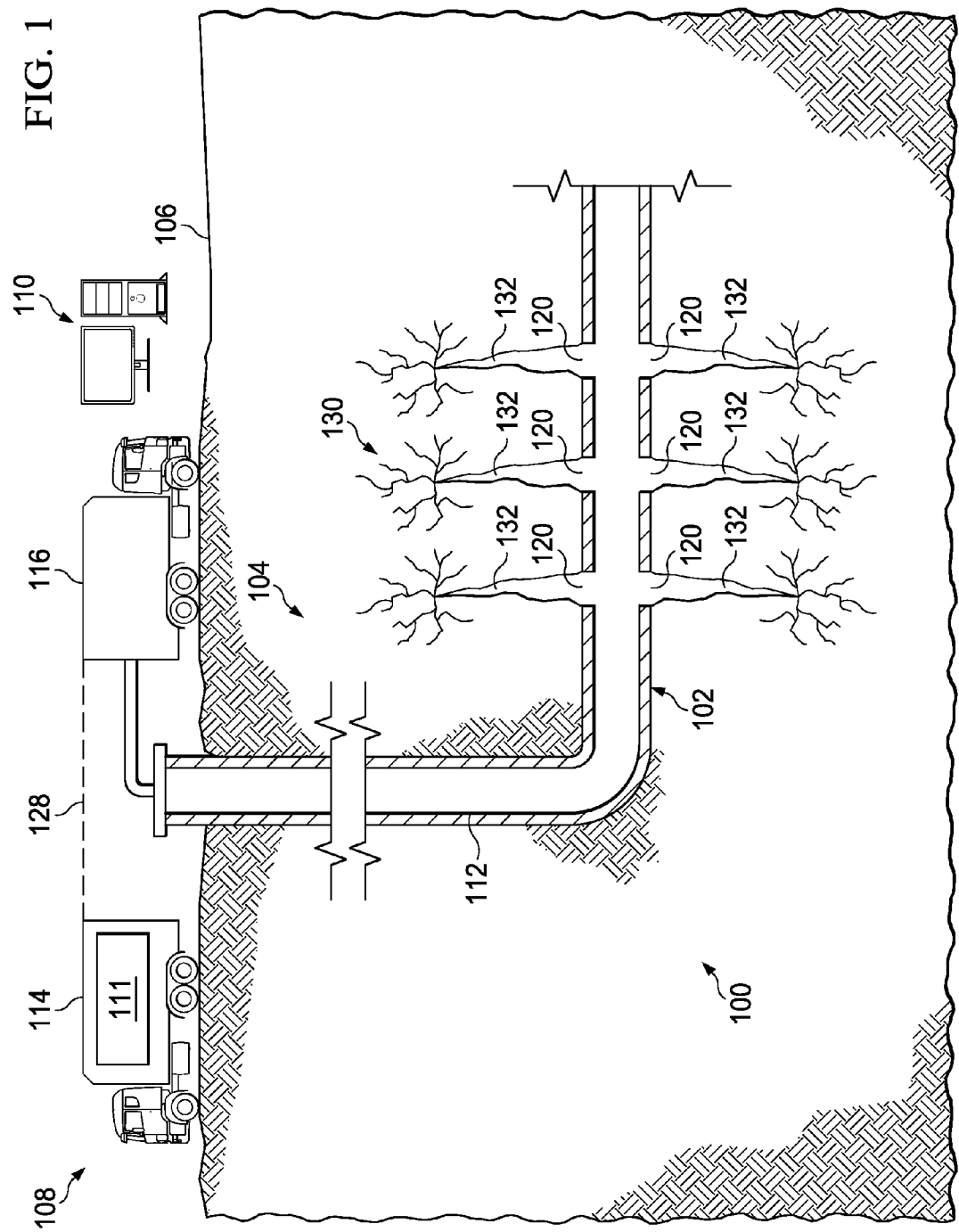
FIG. 1 is a schematic diagram of an example well system.

Fluid flow models can be used to analyze fluid flow, for example, in a well system environment (e.g., in a wellbore, a fracture network, within the reservoir rock matrix, in a well system tool, etc.) or other environments. In some environments, the fluid flow is unsteady and multi-dimensional (e.g., three-dimensional or at least two-dimensional). For example, in some types of fractures, the dominant flow is two-dimensional, and includes transient behaviors. In some instances, two- or three-dimensional flow can be described by a one-dimensional flow model, for example, by integrating the governing flow equations over the cross-section of the two- or three-dimensional flow path. In some cases, the resulting equations include nonlinear partial differential equations that can be solved using finite difference, finite volume, or finite element methods. In some cases, the use of one-dimensional flow models can reduce computational costs, and allow for faster or more computationally efficient simulations. In some instances, a flow model can be used to perform numerical simulations in real time, for example, during a fracture treatment or during another well system activity.

In some cases, a fluid flow model models the flow of fluid in a fracture, for example, during a hydraulic fracturing treatment or another type of injection treatment. Hydraulic fracturing can improve the conductivity of a hydrocarbon reservoir, and modeling the hydraulic fracturing treatment can help to efficiently design, analyze, or optimize the treatment. In some cases, a hydraulic fracturing model combines simulations of fracture propagation, rock deformation, fluid flow, proppant transport, and other phenomena. The fluid flow models used in these and other types of simulations can account for the complex physical environments and conditions. For example, some subterranean formations include low-permeability, naturally-fracture rock media, and the flow models can model a discrete or complex fracture network where the induced fractures interact with natural fractures. Other types of environments and conditions can be modeled.

In a typical finite difference approach, the computational geometry domain can be discretely represented by sequence of connected points called "nodes" or "grid points" or "a mesh." These nodes can represent locations in one, two, or three dimensions. These nodes need not be uniformly distributed in the computational domain. Some numerical schemes can be optimized or otherwise improved by distributing the nodes in the relevant domain.

The governing equations of the fluid flow model can be approximated by discretizing the equations and computing quantities of interest at the nodes, for example, using finite difference operators or other techniques. Discretizing a governing flow equation can use a finite number of terms out of a sum (e.g., an infinite sum) that represents the fluid dynamics. As such, truncation error can be introduced by truncating the discretized governing flow equation. The truncation error can depend on the finite-discretization scheme, the type of the governing equation, and the spatial distribution of the nodes.

In some implementations, the truncation error can have a specified threshold or bound. The truncation error threshold can represent the desired minimum accuracy of the simulated values. Thus, computation efficiency can be improved, for example, if the results are computed to accuracy equal to the truncation error threshold. In some instances, computation of results with accuracy beyond the specified threshold can result in unnecessary use of computational resources. Thus, in some instances, simulations can be configured to maximize truncation error within a specified threshold.

FIG. 1 is a diagram of an example well system 100 and a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations that include low permeability rock (e.g., shale, coal, or others).

The example well system 100 shown in FIG. 1 includes an injection system 108. The injection system 108 can be used to perform an injection treatment, whereby fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

The example injection system 108 can inject treatment fluid into the subterranean region 104 from the wellbore 102. For example, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or combinations of these and others.

The example injection system 108 includes instrument trucks 114, pump trucks 116, and an injection treatment control subsystem 111. The injection system 108 may apply injection treatments that include, for example, a multi-stage fracturing treatment, a single-stage fracture treatment, a mini-fracture test treatment, a follow-on fracture treatment, a re-fracture treatment, a final fracture treatment, other types of fracture treatments, or a combination of these. The injection system 108 may inject fluid into the formation above, at or below a fracture initiation pressure for the formation; above, at or below a fracture closure pressure for the formation; or at another fluid pressure.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The example pump trucks 116 can communicate treatment fluids into the wellbore 102 at or near the level of the ground surface 106. The treatment fluids can be communicated through the wellbore 102 from the ground surface 106 level by a conduit installed in the wellbore 102. The conduit 112 may include casing cemented to the wall of the wellbore 102. In some implementations, all or a portion of the wellbore 102 may be left open, without casing. The conduit 112 may include a working string, coiled tubing, sectioned pipe, or other types of conduit.

The instrument trucks 114 can include mobile vehicles, immobile installations, or other structures. The example instrument trucks 114 shown in FIG. 1 include an injection treatment control subsystem 111 that controls or monitors the injection treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment. In some implementations, communication links allow the instrument trucks 114 to communicate with the computing subsystem 110, which may run simulations and provide simulation data. The well system 100 can include multiple uncoupled communication links or a network of coupled communication links. The communication links can include wired or wireless communications systems, or combinations.

The injection system 108 may also include surface and down-hole sensors to measure pressure, rate, temperature or other parameters of treatment or production. For example, the injection system 108 may include pressure meters or other equipment that measure the pressure of fluids in the wellbore 102 at or near the ground surface 106 level or at other locations. The injection system 108 may include pump controls or other types of controls for starting, stopping, increasing, decreasing or otherwise controlling pumping as well as controls for selecting or otherwise controlling fluids pumped during the injection treatment. The injection treatment control subsystem 111 may communicate with such equipment to monitor and control the injection treatment.

The example injection treatment control subsystem 111 shown in FIG. 1 controls operation of the injection system 108. The injection treatment control subsystem 111 may include data processing equipment, communication equipment, or other systems that control injection treatments applied to the subterranean region 104 through the wellbore 102. The injection treatment control subsystem 111 may be communicably linked to the computing subsystem 110, which may calculate, select, or optimize fracture treatment parameters for initialization, propagation, or opening fractures in the subterranean region 104. The injection treatment control subsystem 111 may receive, generate or modify an injection treatment plan (e.g., a pumping schedule) that specifies properties of an injection treatment to be applied to the subterranean region 104.

In the example shown in FIG. 1, an injection treatment has fractured the subterranean region 104. FIG. 1 shows examples of dominant fractures 132 formed by fluid injection through perforations 120 along the wellbore 102. Generally, the fractures can include fractures of any type, number, length, shape, geometry or aperture. Fractures can extend in any direction or orientation, and they may be formed at multiple stages or intervals, at different times or simultaneously. The example dominant fractures 132 shown in FIG. 1 extend through natural fracture networks 130. Generally, fractures may extend through naturally fractured rock, regions of un-fractured rock, or both. The injected fracturing fluid can flow from the dominant fractures 132, into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 can simulate fluid flow in the well system 100. For example, the computing subsystem 110 can include flow models for simulating fluid flow in or between various locations of fluid flow in the well system, such as, for example, the wellbore 102, the perforations 120, the conduit 112 or components thereof, the dominant fractures 132, the natural fracture networks 130, the rock media in the subterranean region 104, or a combination of these and others. The flow models can model the flow of incompressible fluids (e.g., liquids), compressible fluids (e.g., gases), or a combination multiple fluid phases. The flow models can model the flow of fluid in an intersection of flow paths. In some instances, the flow models can model flow in one, two, or three spatial dimensions. The flow models can include nonlinear systems of differential or partial differential equations. The computing subsystem 110 can generate nodes or a mesh for use in the flow models or simulations. The computing subsystem 110 can use the flow models to predict, describe, or otherwise analyze the dynamic behavior of fluid in the well system 100.

The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection system.

In some cases, the simulations are based on data obtained from the well system 100. For example, pressure meters, flow monitors, microseismic equipment, tiltmeters, or other equipment can perform measurements before, during, or after an injection treatment; and the computing subsystem 110 can simulate fluid flow based on the measured data. In some cases, the injection treatment control subsystem 111 can select or modify (e.g., increase or decrease) fluid pressures, fluid densities, fluid compositions, and other control parameters based on data provided by the simulations. In some instances, data provided by the simulations can be displayed in real time during the injection treatment, for example, to an engineer or other operator of the well system 100.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 2:
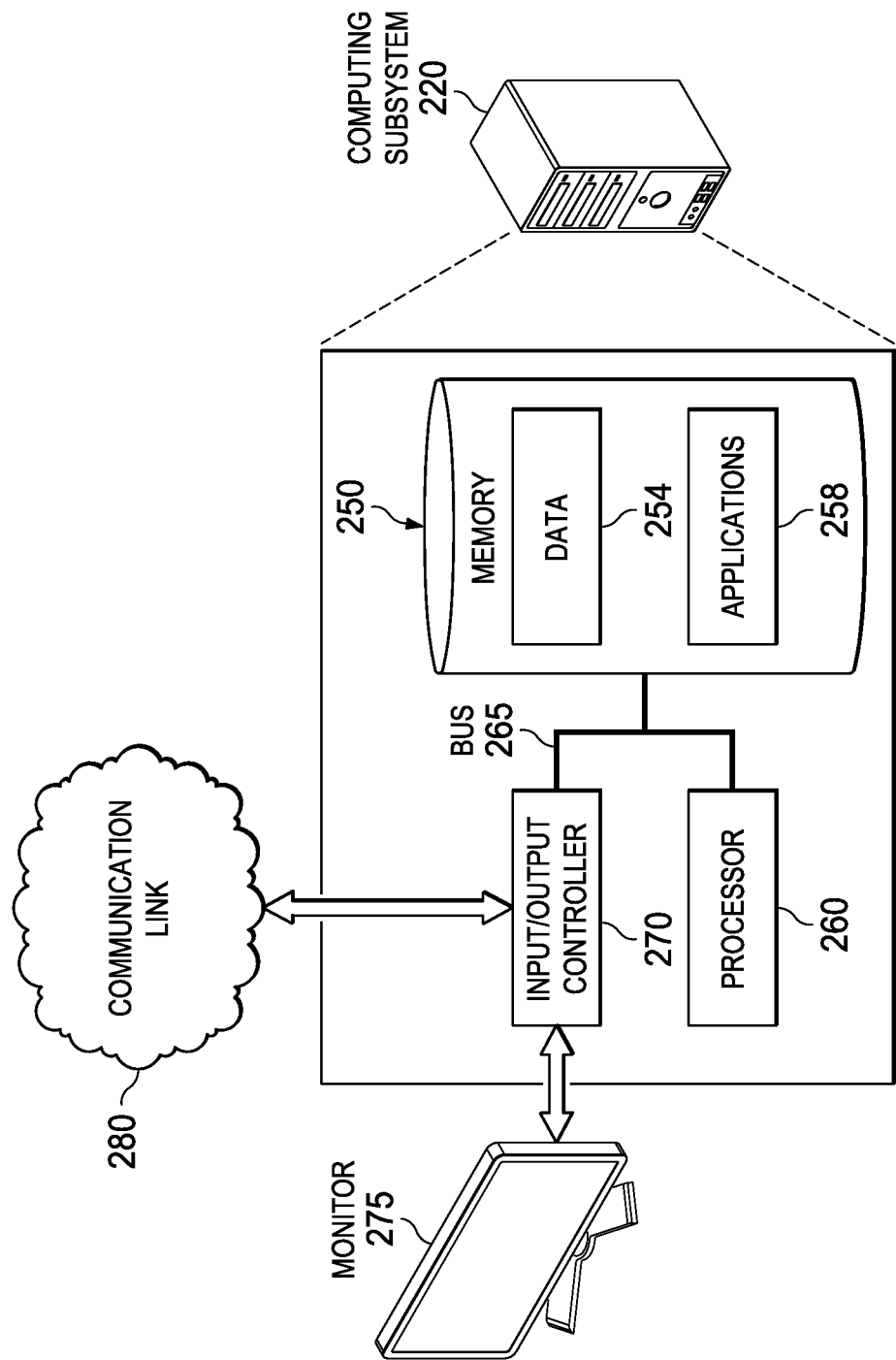
FIG. 2 is a schematic diagram of an example computing system.

FIG. 2 is a diagram of an example computing system 200. The example computing system 200 can operate as the example computing subsystem 110 shown in FIG. 1, or it may operate in another manner. For example, the computing system 200 can be located at or near one or more wells of a well system or at a remote location apart from a well system. All or part of the computing system 200 may operate independent of a well system or well system components. The example computing system 200 includes a memory 250, a processor 260, and input/output controllers 270 communicably coupled by a bus 265. The memory 250 can include, for example, a random access memory (RAM), a storage device (e.g., a writable read-only memory (ROM) or others), a hard disk, or another type of storage medium. The computing system 200 can be preprogrammed or it can be programmed (and reprogrammed) by loading a program from another source (e.g., from a CD-ROM, from another computer device through a data network, or in another manner). In some examples, the input/output controller 270 is coupled to input/output devices (e.g. a monitor 275, a mouse, a keyboard, or other input/output devices) and to a communication link 280. The input/output devices can receive or transmit data in analog or digital form over communication links such as a serial link, a wireless link (e.g. infrared, radio frequency, or others), a parallel link, or another type of link.

The communication link 280 can include any type of communication channel, connector, data communication network, or other link. For example, the communication link 280 can include a wireless or a wired network, a Local Area Network (LAN), a Wide Area Network (WAN), a private network, a public network (such as the Internet), a WiFi network, a network that includes a satellite link, or another type of data communication network.

The memory 250 can store instructions (e.g., computer code) associated with an operating system, computer applications, and other resources. The memory 250 can also store application data and data objects that can be interpreted by one or more applications or virtual machines running on the computing system 200. As shown in FIG. 2, the example memory 250 includes data 254 and applications 258. The data 254 can include treatment data, geological data, fracture data, fluid data, or any other appropriate data. The applications 258 can include flow models, fracture treatment simulation software, reservoir simulation software, or other types of applications. In some implementations, a memory of a computing device includes additional or different data, application, models, or other information.

In some instances, the data 254 include treatment data relating to fracture treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

In some instances, the data 254 include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

In some instances, the data 254 include fracture data relating to fractures in the subterranean region. The fracture data may identify the locations, sizes, shapes, and other properties of fractures in a model of a subterranean zone. The fracture data can include information on natural fractures, hydraulically-induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

In some instances, the data 254 include fluid data relating to well system fluids. The fluid data may identify types of fluids, fluid properties, thermodynamic conditions, and other information related to well system fluids. The fluid data can include flow models for compressible or incompressible fluid flow. For example, the fluid data can include systems of governing equations (e.g., Navier-Stokes equation, continuity equation, etc.) that represent fluid flow generally or fluid flow under certain types of conditions. In some cases, the governing flow equations define a nonlinear system of equations. The fluid data can also include information about truncation error thresholds or other system constraints. The fluid data can include data related to native fluids that naturally reside in a subterranean region, treatment fluids to be injected into the subterranean region, hydraulic fluids that operate well system tools, or other fluids that may or may not be related to a well system.

The applications 258 can include software applications, scripts, programs, functions, executables, or other modules that are interpreted or executed by the processor 260. For example, the applications 258 can include a fluid flow simulation module, a hydraulic fracture simulation module, a reservoir simulation module, or another other type of simulator. The applications 258 may include machine-readable instructions for performing one or more of the operations related to FIGS. 3-5. For example, the applications 258 can include modules or algorithms for generating a distribution of nodes. The applications 258 may include machine-readable instructions for generating a user interface or a plot, for example, illustrating fluid flow or fluid properties. The applications 258 can receive input data, such as treatment data, geological data, fracture data, fluid data, or other types of input data, from the memory 250, from another local source, or from one or more remote sources (e.g., via the communication link 280). The applications 258 can generate output data and store the output data in the memory 250, in another local medium, or in one or more remote devices (e.g., by sending the output data via the communication link 280).

The processor 260 can execute instructions, for example, to generate output data based on data inputs. For example, the processor 260 can run the applications 258 by executing or interpreting the software, scripts, programs, functions, executables, or other modules contained in the applications 258. The processor 260 may perform one or more of the operations related to FIGS. 3-5. The input data received by the processor 260 or the output data generated by the processor 260 can include any of the treatment data, the geological data, the fracture data, or any other data.

Figure 3:
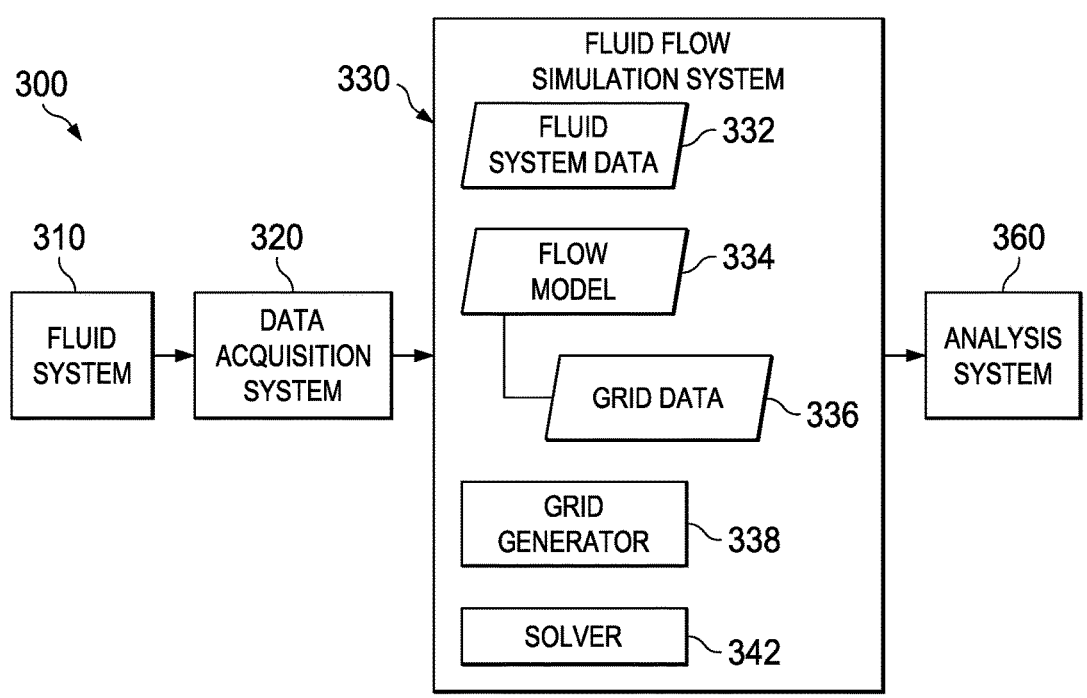
FIG. 3 is a diagram of an example system architecture.

FIG. 3 is a diagram of an example system architecture 300. The example system architecture 300 can be used to model physical phenomena related to a well system environment. For example, the architecture 300 can be used to model fluid flow in an injection treatment of the subterranean region 104 shown in FIG. 1. In some instances, the architecture 300 is used to model fluid flow and other aspects of an injection treatment or other activities in a well system. In some cases, the architecture 300 is used to model fluid flow within or between one or more wellbores, wellbore conduits, wellbore tools, wellbore perforations, reservoir rock media, reservoir fractures (e.g., fractures in a complex fracture network, in a dominant bi-wing fracture extending from a wellbore, in a natural fracture network, in hydraulically-induced fractures, etc.), or combinations of these and other types of flow paths in a well system environment.

The example architecture 300 shown in FIG. 3 includes a fluid system 310, a data acquisition system 320, a fluid flow simulation system 330, and an analysis system 360. The architecture 300 can include additional or different components or subsystems, and the example components shown in FIG. 3 can be combined, integrated, divided, or configured in another manner. For example, the fluid flow simulation system 330 and the analysis system 360 can be subcomponents of an integrated computing system (e.g., the computing system 200 shown in FIG. 2) or multiple computing systems; or the data acquisition system 320 can be integrated with the fluid system 310. As another example, the fluid flow simulation system 330 or the analysis system 360, or both, can be implemented in a computing system that operates independent of the fluid system 310 or the data acquisition system 320.

The example fluid system 310 can include any physical system where fluid flow or other fluid phenomena occur. The fluid system 310 can represent a well system environment (e.g., the well system 100 shown in FIG. 1) or a subset of well system components or subsystems (e.g., the injection system 108 shown in FIG. 1). The fluid system 310 can include the physical reservoir rock in a subterranean reservoir (e.g., the subterranean region 104 shown in FIG. 1), fractures or a fracture network in the reservoir rock, one or more downhole systems installed in a wellbore, or a combination of them.

The data acquisition system 320 can include systems or hardware that obtain data from the fluid system 310. For example, the data acquisition system 320 can include flow sensors, pressure sensors, temperature sensors, and other types of measurement devices. The data acquisition system 320 can include communication and data storage systems that store, transfer, manipulate, or otherwise manage the information obtained from the fluid system 310.

The fluid flow simulation system 330 can include one or more computer systems or computer-implemented programs that simulate fluid flow. The fluid flow simulation system 330 can receive information related to the fluid system 310 and simulate fluid flow and other fluid phenomena that occur in the fluid system 310. For example, the fluid flow simulation system 330 can calculate flow velocities or other aspects of fluid flow based on data from the data acquisition system 320 or another source.

The example fluid flow simulation system 330 includes fluid system data 332, flow models 334, and a solver 342. The fluid flow simulation system can include additional or different features, and the features of a fluid flow simulation system 330 can be configured to operate in another manner. The modules of the fluid flow simulation system 330 can include hardware modules, software modules, or other types of modules. In some cases, the modules can be integrated with each other or with other system components. In some example implementations, the fluid flow simulation system 330 can be implemented as software running on a computing system, and the modules of the fluid flow simulation system 330 can be implemented as software functions or routines that are executed by the computing system.

The fluid system data 332 can include any information related to the fluid system 310 or another fluid system. For example, the fluid system data 332 can indicate physical properties (e.g., geometry, cross-sectional areas, surface properties, etc.) of one or more flow paths in the fluid system 310, material properties (e.g., density, viscosity, Reynolds number, etc.) of one or more fluids in the fluid system 310, thermodynamic data (e.g., fluid pressures, fluid temperatures, fluid flow rates, etc.) measured at one or more locations in the fluid system 310, and other types of information. The fluid system data 332 can include information received from the data acquisition system 320 and other sources.

The flow models 334 can include any information or modules that can be used to simulate fluid flow. The flow models 334 can include governing equations, spatial and temporal discretization data, truncation error thresholds, or other information. In some examples, the flow models 334 include governing flow equations, such as, for example, the Navier-Stokes equation or related approximations of the Navier-Stokes equation, diffusion-convection equations, continuity equations, or other types of flow equations. As an example, the flow models 334 may include any equations below; or the flow models 334 may include additional or different governing flow equations.

The flow models 334 can include spatial discretization data, such as, for example, discrete nodes that represent locations of fluid flow along flow paths in the fluid system 310. Generally, the flow models 334 can represent any number of intersecting flow path branches, including any type of flow path intersection. In some cases, the flow path branches represent a fracture network in a subterranean region, and connectivity between the flow path branches can correspond to the fracture connectivity in the fracture network. In some cases, the flow paths represent flow conduits in a wellbore, perforations in a wellbore casing, hydraulic fractures extending from a wellbore, natural fractures connected to hydraulic fractures or a wellbore, or other types of interconnected flow paths in a well system environment.

The spatial discretization of the flow paths can be implemented by any suitable algorithm. For example, the system can be discretized according to a finite difference model, a finite volume model, finite element model, or another technique. The system can be discretized in a manner that permits spatial derivatives or partial spatial derivatives to be solved in the discretized spatial domain using numerical methods.

As shown in FIG. 3, the fluid flow simulation system 330 can also include grid data 336 and a grid generator 338. The grid generator 338 can include any information or modules that can be used to generate grid points (also referred to as "nodes") for a flow model. For example, the grid generator 338 can generate a distribution of grid points along a flow path based on the length of the flow path, truncation error thresholds, an estimated grid point distribution, a desired number of grid points, or a combination of these and other factors. In some cases, the grid generator 338 generates the grid points according to the example process 500 shown in FIG. 5, or the grid generator 338 may operate in another manner.

The grid data 336 can be included as part of the flow model 334 or can be based on one or more flow path parameters. All or part of the grid data 336 can be generated by the grid generator 338 or another type of module. The grid data 336 can indicate the grid point locations for a one-dimensional flow model. In some cases, the grid data 336 can indicate grid point locations that result in a truncation error within a designated threshold.

In some implementations, the fluid flow simulation system 330 can also include a time marching module to perform calculations in a discretized time domain. For example, the governing flow equations may include derivatives or partial derivatives in the time domain, and the time marching module can calculate such quantities based on a time marching algorithm. Example time marching schemes include the backward Euler scheme, the Crank-Nicolson scheme, and others.

The solver 342 can include any information or modules that can be used to solve a system of equations. For example, the solver 342 can be a direct solver or another type of solver. In some implementations, the solver 342 receives inputs from the other components of the fluid flow simulation system 330. For example, the inputs can include the discretized governing flow equations, the grid data 336, the fluid system data 332, or any other information. The inputs can also include data generated or reported from a separate simulation or model. The solver 342 can generate a numerical solution for a variable of interest based on the inputs. The solution can be generated for some or all of the grid points in a discretized spatial domain. For example, the solver 342 may calculate values of fluid velocity, fluid pressure, or another variable over a spatial domain; the values can be calculated for an individual time step or multiple time steps.

The analysis system 360 can include any systems, components, or modules that analyze, process, use, or access the simulation data generated by the fluid flow simulation system 330. For example, the analysis system 360 can be a real time analysis system that displays or otherwise presents fluid data (e.g., to a field engineer, etc.) during an injection treatment. In some cases, the analysis system 360 includes other simulators or a simulation manager that use the fluid simulation data to simulate other aspects of a well system. For example, the analysis system 360 can be a fracture simulation suite that simulates fracture propagation based on the simulated fluid flow data generated by the fluid flow simulation system 330. As another example, the analysis system 360 can be a reservoir simulation suite that simulates fluid migration in a reservoir based on the simulated fluid flow data generated by the fluid flow simulation system 330.

Figure 4:
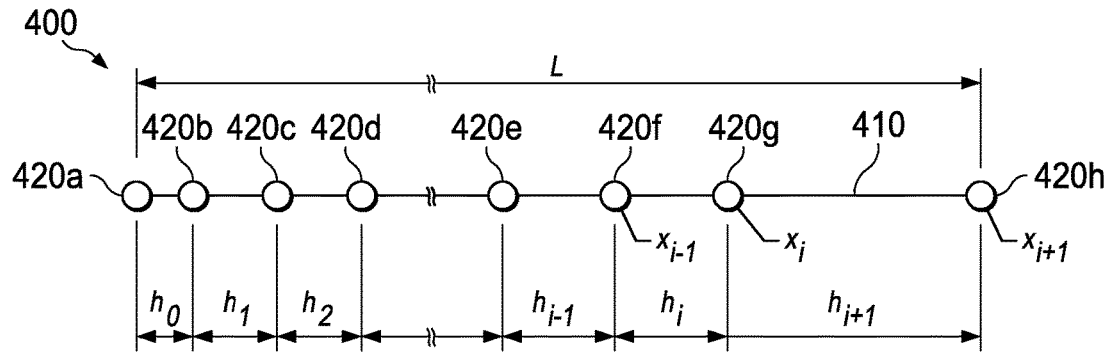
FIG. 4 is a diagram showing an example flow path with nodes.

FIG. 4 is a diagram showing aspects of an example fluid flow model 400. The example fluid flow model 400 includes a flow path segment 410 and multiple nodes 420a-h. The example flow path segment 410 shown in FIG. 4 is a linear flow path, but a flow path can extend through more than one spatial dimension. For example, a flow path can include a curve or multiple intersecting flow paths that extend through two or three spatial dimensions.

The example fluid flow model 400 includes example nodes 420a-h. In some implementations, a flow path in a one-dimensional flow model can include any number of grid points. In some cases, grid points represent locations where fluid flow values (e.g. pressure, flow velocity) are calculated in simulations of the fluid flow model 400. The nodes 420a-h can be distributed uniformly or nonuniformly along the flow path 410. In some cases, the distribution of nodes can be generated to satisfy criteria for a simulation, or an existing distribution of nodes can be adjusted to satisfy the criteria. For example, an existing distribution of nodes can be modified by adding or removing nodes, or by adjusting the locations of one or more existing nodes.

An example of a governing flow equation that can be used in a one-dimensional flow model is the linear convection-diffusion equation, which can be expressed:

$$a(x)u_x + b(x)u - \vartheta u_{xx} = 0. \quad (1)$$

In Equation (1), $u_x$ represents the first derivative and $u_{xx}$ represents the second derivative of the solution variable u with respect to the spatial coordinate x. A discretization of Equation (1) at the $i^{th}$ node (e.g. example node 420g) gives:

$$a_i u_{x,i} + b_i u_i - \vartheta u_{xx,i} = 0. \quad (2)$$

The governing flow equations can be discretized for the nodes of a flow model according to a discretization method. As an example, the governing flow equation can be discretized using a finite difference approximation. In some instances, a finite difference approximation for the derivatives over a non-uniform distribution of nodes can be expressed, for example, $$u_{x,i} = \frac{u_{i+1} h_{i-1}}{h_i (h_i + h_{i-1})} - \frac{u_{i+1} h_i}{h_i (h_i + h_{i-1})} - \frac{h_i - h_{i-1}}{h_i h_{i-1}} u_i - \frac{h_i h_{i-1}}{6} u_i^{iii} \text{ and} \quad (3)$$

-continued $$u_{xx,i} = \frac{2u_{i+1}}{h_i(h_i + h_{i-1})} + \frac{2u_{i-1}}{h_i(h_i + h_{i-1})} - \frac{2u_i}{h_i h_{i-1}} - \frac{h_i - h_{i-1}}{h_i h_{i-1}} u_i^{iii} - \frac{h_i^2 - h_i h_{i-1} + h_{i-1}^2}{12} u_i^{iv}. \quad (4)$$

In the example Equations (3) and (4), the node spacing is defined as $h_i = x_{i+1} - x_i$ and $h_{i-1} = x_i - x_{i-1}$ for the node spacing at locations i and (i−1) respectively (see, for example, FIG. 4). A discretized governing flow equation can be truncated for use in numerical simulations, for example, by omitting terms above a specified order in a series expansion. The lowest-order term truncated from the series expansion can be referred to as the leading truncation error (TE) term. With reference to the example equations above, the leading truncation error (TE) terms can be, for example, the last term in Equation (3) and the last two terms in Equation (4). In this example, the leading truncation error terms are the terms for derivatives greater than second-order. In some instances, the leading truncation error terms correspond to the second-order, third-order, or higher order derivative of a variable of interest.

The leading truncation error terms from Equations (3) and (4) can be collected together to yield $$TE_i = -\frac{1}{12}[2a_i u_i^{iii} h_i h_{i-1} - 4\vartheta u_i^{iii}(h_i - h_{i-1}) - \vartheta u_i^{iv}(h_i^2 - h_i h_{i-1} + h_{i-1}^2)]. \quad (5)$$

The terms $u_i^{iii}$ and $u_i^{iv}$ represents the third and the fourth derivative of the solution variable with respect to the spatial coordinate x. Equation (5) has collected the lowest-order terms of those truncated from the finite difference approximation of the convection-diffusion Equations (2), (3), and (4). Although in this example the governing flow equations are linear, the net truncation error expression given by Equation (5) represents a system of non-linear equations for node distribution. A root-finding algorithm can be used to obtain a node distribution that meets truncation error criteria.

An upper threshold for the absolute value of the truncation error C can be specified by a user, algorithm, or other system. For example, the truncation error threshold C can be a value such as $10^{-5}$ or another value. A fluid flow model or system can have multiple truncation error thresholds associated with different parts of the model or system. To obtain the maximum allowed truncation error, the truncation error terms TE can be equal or substantially equal to the truncation error threshold C. A root-finding algorithm for Equation (5) can be configured to accommodate both the positive and the negative values of the truncation error threshold C.

In some implementations, the following adaptive meshing algorithm can be used. For example, a collection of cost functions can be composed from individual cost functions for each node. The collection of cost functions can be expressed:

$$F(x_i) = TE(x_i)^2 - C^2 = 0. \quad (6)$$

Here, squaring the truncation error threshold C eliminates the dependency on the sign of the truncation error. Equation (6) is implemented at each of the nodes, and together with Equation (5) it represents a set of non-linear equations. An algorithm can solve the above system of equations by the multi-dimensional Newton-Raphson (MD-NR) method. To perform the MD-NR technique, the truncation error can be recast in terms of the nodal coordinates as:

$$TE(x_i) = -\frac{1}{12}[2a_i u_i^{iii}(x_{i+1} - x_i)(x_i - x_{i-1}) - 4\vartheta u_i^{iii}(x_{i+1} - x_{i-1}) - \vartheta u_i^{iv}((x_{i+1} - x_i)^2 - (x_{i+1} - x_i)(x_i - x_{i-1}) + (x_i - x_{i-1})^2)]. \quad (7)$$

The MD-NR update scheme can be given by a vector relation:

$$x^{n+1} = x^n + \delta x^n. \quad (8)$$

Here x represents vector containing all the nodal coordinates. The correction vector δx is computed as $$\delta x^n = -J^{-1} F(x^n) \quad (9)$$

where the Jacobin matrix J can be computed as:

$$J = 2TE(x^n)\frac{\partial TE(x)}{\partial x}. \quad (10)$$

From Equation (7) it can be observed that the Jacobin matrix is a tridiagonal matrix, hence the linear system of equations given by Equations (8) and (9) can efficiently be solved. The Equations (7), (8), (9), and (10) form a closed system with Dirichlet boundary conditions $x_0 = a$ and $x_N = b$, in which a and b represent the extreme left and right side ends of the domain, respectively. The boundary conditions can enforce the preservation of the computational domain span.

As such, an algorithm that uses the MD-NR technique can use a vector-based cost function to determine a distribution of nodes that satisfies truncation error criteria. The MD-NR technique can use an initial guess for the spatial coordinate vector $x^0$, and in some cases, the algorithm will converge only if initial guess is close to the solution. For some cases, computing a suitable initial guess can be inefficient or time-consuming, for example, as the number of nodes increases. Updating each MD-NR iteration can include solving a system of linear equations based on a collection of cost functions, and the MD-NR method can provide node distributions that meet the imposed constraints. In some instances, the distribution generated by an MD-NR technique includes entangled or otherwise unacceptable node locations, which can be corrected.

In some implementations, a grid-generation algorithm can use a scalar cost function to determine a distribution of node locations that satisfies truncation error criteria. For example, a scalar cost function can be used as a minimization function for a scalar Newton-Raphson technique. The use of a scalar cost function can, in some instances, avoid the need for multiple cost functions, vector-based minimization criteria, or the multidimensional Newton-Raphson method. For example, an algorithm that minimizes a scalar cost function using a scalar Newton-Raphson technique can be executed faster and with fewer constraints and computational requirements than the MD-NR. In some cases, the scalar Newton-Raphson technique can operate on a larger number of nodes, tolerate a wide range of initial guesses, produce acceptable (e.g., non-entangled) output locations, reduce the number of vector or matrix operations, or provide a combination of these and other benefits.

In some instances, the truncation error for each nodes is adjusted (e.g., increased, decreased, maximized, etc.) to a value that is within (e.g., greater than or equal to, or substantially equal to) the truncation error threshold. In some examples, a scalar Newton-Raphson method uses a marching approach that generates a node distribution that adjusts the truncation error for each node to the specified truncation error threshold value for the node. For example, $\eta_i$ can be defined as the ratio of successive mesh spacing given by $\eta_i = h_i/h_{i-1}$. Then, the truncation error relation can be written as a quadratic equation:

$$\frac{12TE_i}{\partial u_i^{iv} h_{i-1}^2} = \eta_i^2 - \left(2\frac{a_i u_i^{iii}}{\nu u_i^{iv}} + K\right)\eta_i + K \quad (11)$$

$$\text{where } K = 1 - 4\frac{u_i^{iii}}{u_i^{iv} h_{i-1}}. \quad (12)$$

Thus, equation (11) becomes $$\eta_i^2 - f_i \eta_i + g_i = 0 \quad (13)$$

$$\text{where } f_i = 1 + \frac{2u_i^{iii}}{u_i^{iv}}\left(\frac{a_i}{\nu} - \frac{2}{h_{i-1}}\right) \text{ and} \quad (14)$$

$$g_i = 1 - \frac{4u_i^{iii}}{h_{i-1} u_i^{iv}} - \frac{12TE_i}{\partial u_i^{iv} h_{i-1}^2}. \quad (15)$$

Equation (13) is a quadratic equation that can compute each node spacing $h_i$ by providing an estimated starting node spacing $h_0$ and implementing a marching method.

In some cases, the condition $\Sigma h_i = L$, where L is the extent or total length of the computational domain in the x-direction, cannot be enforced for every estimated starting node spacing $h_0$. Since the sum of all the spacings $\Sigma h_i$ depends on $h_0$, an external scalar Newton method can be used to fulfill the following example scalar cost function:

$$F(h_0) = \Sigma h_i - L = 0. \quad (16)$$

Equation (16) is an example scalar cost function; another scalar cost function can be used. An external scalar Newton's Method for root-finding can be used to determine a continuous update algorithm or iterative algorithm for obtaining an improved estimate for $h_0$:

$$h_0^{n+1} = h_0^n - \frac{F(h_0^n)}{\frac{\partial \Sigma h_i}{\partial h_0}} \quad (17)$$

$$\text{where } \frac{\partial \Sigma h_i}{\partial h_0} = 1 + \sum_{1}^{N-1} \frac{\partial h_i}{\partial h_0}. \quad (18)$$

The value $\xi_i$ can be defined as the first derivative of $\eta_i$ with respect to the estimated starting node spacing $h_0$, $$\xi_i = \frac{\partial \eta_i}{\partial h_0}. \quad (19)$$

Combining Equations (13) and (19) gives $$\xi_i = \frac{\eta_i f_i' - g_i'}{2\eta_i - f_i} \quad (20)$$

where $f_i'$ and $g_i'$ represent the derivative of f and g with respect to $h_0$. The derivatives $f_i'$ and $g_i'$ can be computed using Equations (14) and (15).

The derivatives used to evaluate the equation (17) can be computed as $$\frac{\partial h_i}{\partial h_0} = \quad (21)$$

-continued $$\eta_i \eta_{i-1} \eta_{i-2} \cdots \eta_2 \eta_1 + h_0(\xi_i \eta_{i-1} \eta_{i-2} \cdots \eta_2 \eta_1 + \eta_i \xi_{i-1} \eta_{i-2} \cdots \eta_2 \eta_1 + \cdots \eta_i \eta_{i-1} \eta_{i-2} \cdots \eta_2 \xi_1).$$

Equation (21) can be simplified by defining a variable $\alpha_i$ as the product of the sequence of $\eta_i$:

$$\alpha_i = \prod_{j=1}^{i} \eta_j = \frac{h_i}{h_0}. \quad (22)$$

Thus, the expression for derivatives can be simplified to:

$$\frac{\partial h_i}{\partial h_0} = \frac{h_i}{h_0} + h_i \sum_{j=1}^{i} \frac{\xi_j}{\eta_j}. \quad (23)$$

Thus, an outer Newton iteration can be performed to improve the estimation of $h_0$.

In some implementations, the quadratic equation (13) can have, at most, two real roots. Thus at every node the system may have two legitimate solutions. For a given $h_0$, there may be multiple solutions. In some cases, an algorithm produces only monotonic node distributions, as all the other possible entangled node distributions may be eliminated through the solution algorithm. The outer scalar Newton method can also produce multiple estimates of $h_0$ leading to large set of possible solutions.

Figure 5:
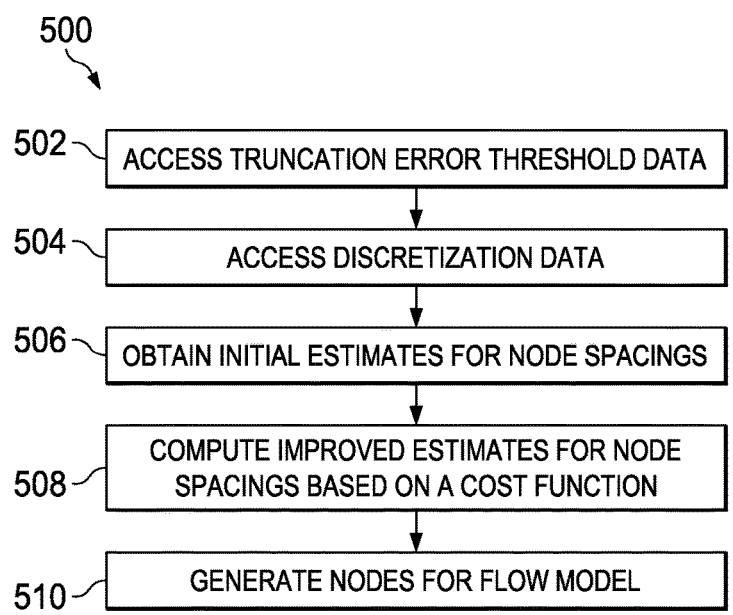
FIG. 5 is a flow chart showing an example technique for generating a node distribution.

FIG. 5 is a flow chart showing an example process 500 for generating a node distribution. All or part of the example process 500 may be computer-implemented, for example, using the features and attributes of the example computing system 200 shown in FIG. 2 or other computing systems. The process 500, individual operations of the process 500, or groups of operations may be iterated or performed in parallel, in series, or in another manner. In some cases, the process 500 may include the same, additional, fewer, or different operations performed in the same or a different order.

The example process 500 can be used to generate nodes for modeling a variety of physical systems. In some implementations, the process 500 is used to generate nodes for modeling a fluid injection or production system (e.g., in a wellbore, in a flow control device or flow conduit installed in a wellbore, etc.), within a subterranean formation (e.g., from a wellbore into reservoir media, through a rock matrix in the reservoir media, through fractures or discontinuities in the reservoir media, etc.), or combinations thereof. The process 500 may also be used to generate nodes for modeling other environments, for example, outside the context of a well system.

At 502, truncation error threshold data are accessed. The truncation error threshold data can indicate a truncation error threshold value for the nodes of a one-dimensional flow model. The truncation error threshold data can include a single value that specifies the same threshold value for all nodes, a group of nodes, or an individual node. The truncation error threshold data can include multiple values (e.g., an array of scalar values), where each value specifies a threshold value for an individual node or group of nodes. For example, a different truncation error threshold value can be specified for each node. The truncation error threshold data can be user specified or computed by an algorithm, model, or system.

At 504, discretization data are accessed. The discretization data can be based on the discretization of governing flow equations. In some instances, the discretization data indicates one or more lowest-order terms truncated from a discretized governing flow equation. The discretization data can be associated with individual nodes or collections of nodes. In some cases, the discretization data for an individual node indicates the lowest-order terms truncated from one or more governing flow equations for the individual node.

Discretization data can include equations, mathematical expressions, data structures, or other types of information. In some cases, the discretization data are accessed by defining a truncation error relation. For example, the truncation error relations provided by Equations (11), (12), (13), (14), and (15) include discretization data representing lowest-order terms truncated from a discretized governing flow equation. Other truncation error relations can be generated based on other governing flow equations, or other discretization techniques.

At 506, initial estimates for node spacings are obtained. An initial estimate for a node spacing can be obtained, for example, based on an algorithm, based on information from a prior iteration or simulation, based on a pre-defined value, or other techniques. In some cases, the initial estimates for multiple node spacings can be computed based on an initial estimate for the spacing between one pair of nodes. In some cases, truncation error relations or other criteria can be used to compute the initial estimates based on an initial guess for one or more of the spacings. For example, provided an initial guess for $h_0$, (or another spacing), Equation (13) can be used to generate an initial estimate for the other spacings.

At 508, improved estimates for node spacings are computed. The improved estimates for node spacings can be based on a scalar cost function such as Equation (16). For example, improved estimates for node spacings can be calculated by iteratively calculating an improved estimate for starting node spacing using Equation (17). In some cases, once an improved estimate for one of the node spacings is calculated based on a scalar cost function, truncation error relations or other criteria can be used to compute improved estimates for the other spacings. For example, provided an improved estimate for $h_0$ (or another spacing), Equation (13) can be used to generate an improved estimate for the other spacings.

In some cases, the improvement in the spacings can be defined with respect to a cost function. For example, an improved estimate for node spacings can provide node spacing values that sum to a total length that is closer to the total length of the flow path, or additional improvement criteria can be used. In some instances, the improved estimates of the node spacings change the locations of one or more of the nodes, while maintaining the relevant truncation error terms (e.g., the lowest-order terms truncated from one or more governing flow equations) less than or equal to the truncation error threshold value for each respective node At 510, the node locations are generated. The node locations can be generated using the improved estimates for node spacings. The node locations can be generated, for example, by mapping or transforming the node spacings to the physical geometry of a flow path. In some cases, the truncation error for each node location is less than or equal to the truncation error threshold values specified by the data accessed at 502.

The nodes can be provided to a model or simulation system, or used with any appropriate flow path or domain. In some cases, after the node locations are generated for a flow model, the flow model is operated, for example, to simulate fluid flow along a flow path represented by the nodes. The simulations can use the discretized (and truncated) governing flow equations to compute values for variables of interest at each node.

FIG. 6 shows a plot 600 of an example distribution of truncation error for a collection of 32 nodes in a fluid flow model. The nodes are shown as diamond-shaped data points. The x-axis represents the location of nodes along a flow path. The y-axis represents the calculated truncation error at each node. In FIG. 6, the example node locations were calculated using the multidimensional Newton-Raphson method with example Equations (8), (9), and (10). The truncation error threshold value has been set to $10^{-5}$.

FIG. 6 shows that using the example multidimensional method to generate node locations, each node can have a truncation error arbitrarily close to the threshold. In this example, the truncation error threshold is defined as an absolute value, so the truncation error at each node can be near a positive value of the threshold (e.g. $+10^{-5}$) or near a negative value of the threshold (e.g. $-10^{-5}$). FIG. 6 shows an example where adaptively generating a node distribution can maximize or otherwise adjust the truncation error within a specified threshold, which may improve computational efficiency in some instances.

FIG. 7 shows a plot 700 of an example distribution of truncation error for a collection of 32 nodes in a fluid flow model. The nodes are shown as diamond-shaped data points. The x-axis represents the location of nodes along a flow path. The y-axis represents the calculated truncation error at each node. In FIG. 7, the node locations were computed using the example scalar cost function and associated iterative algorithm described above with respect to Equations (11) through (23). The truncation error threshold value has been set to $10^{-5}$ in the example shown.

FIG. 7 shows that using the example scalar cost function to generate node locations, each node can have a truncation error arbitrarily close to the threshold. FIG. 7 shows an example where adaptively generating a node distribution can adjust the truncation error within a specified threshold. In some instances, the scalar method can compute node locations more efficiently than the multidimensional method while still maximizing or otherwise adjusting truncation error within the threshold. A comparison between FIG. 6 and FIG. 7 shows an example where a single system can have multiple solutions that meet an imposed truncation error threshold. In some instances, for example, where there are multiple solutions, it is possible to impose additional requirements on the grid, to obtain a grid that has other desirable features in addition to keeping the truncation error bounded.

Figure 8:
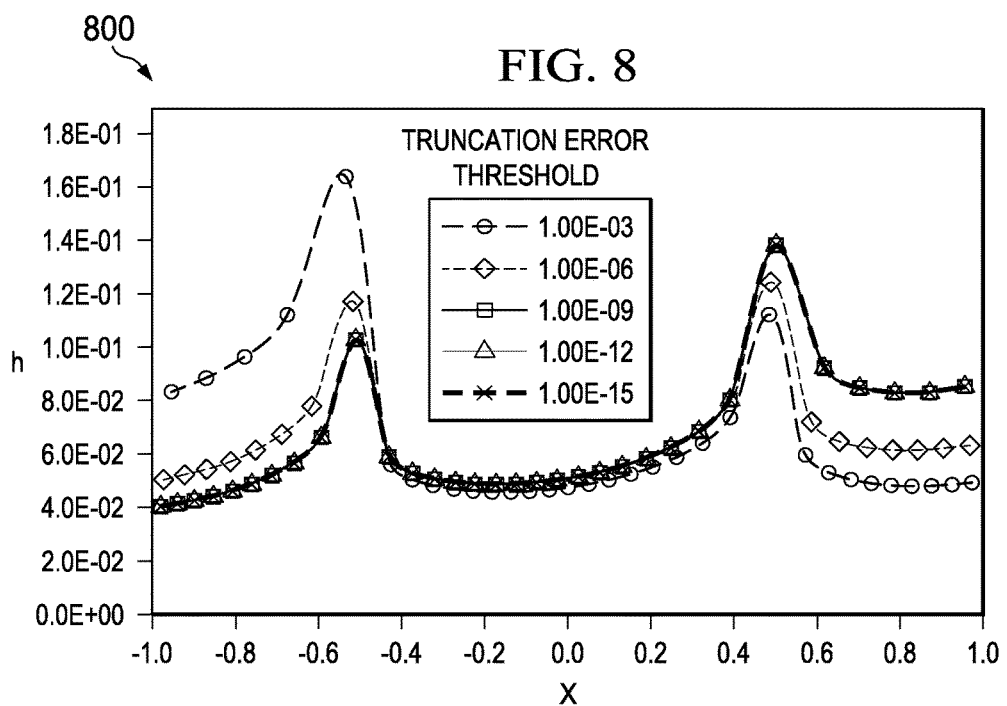
FIG. 8 is a plot showing example node distributions based on truncation error threshold.

FIG. 8 shows a plot 800 of example node distributions for multiple specified truncation error thresholds. Each curve has been calculated for 32 nodes using the example scalar cost function and associated iterative algorithm described above. The x-axis represents the location of nodes along a flow path. The y-axis represents the spacing between each pair of nodes. The node distributions can be seen to converge asymptotically. FIG. 8 indicates that the example iterative algorithm that uses a scalar cost function is able to adjust the node locations for wide range of imposed truncation error thresholds. The example scalar method is able to optimize the node locations for maximizing truncation error within the threshold.

Figure 9:
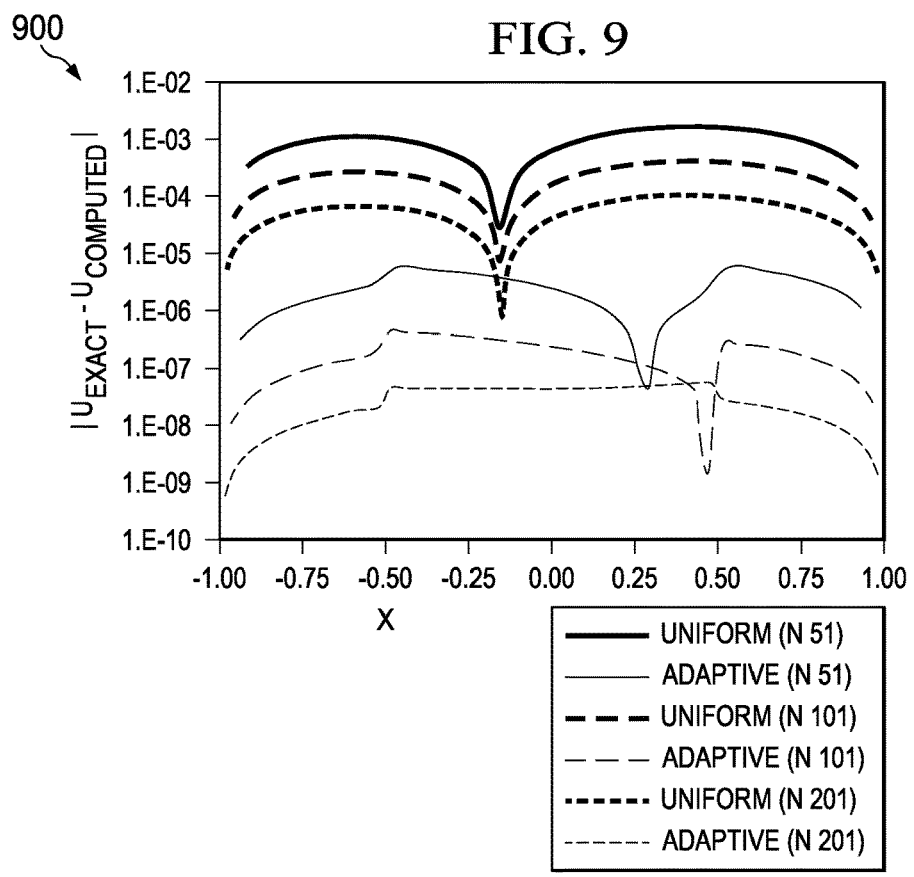
FIG. 9 is a plot showing accuracy for types of node distribution.

FIG. 9 shows a comparison plot 900 between uniform node distributions and adaptive node distributions. The uniform node distributions have the nodes evenly spaced over the computational domain. The adaptive node distributions have the nodes spaced according to the example scalar method described previously. The x-axis represents the location of nodes along a flow path. The y-axis represents the error distribution over the computational domain for each node. In this example, the error distribution is calculated as the difference between the computed solution and the exact solution. In FIG. 9, curves for three different node densities are shown (51, 101, and 201 nodes). In each pair of curves, the adaptive node distribution approach outperforms the uniform node distribution results. In the example shown, the simulation using adaptive distribution algorithm with 51 nodes produces more accurate results than the simulation using a uniform distribution with 201 nodes.

Figure 10A:
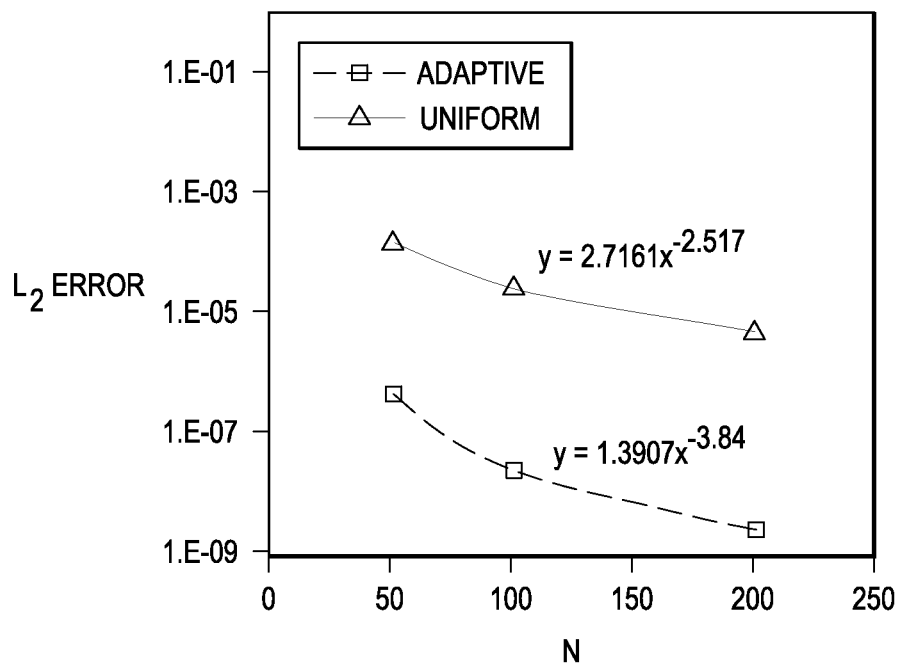
FIG. 10A is a plot showing error norms for the curves shown in FIG. 9.
Figure 10B:
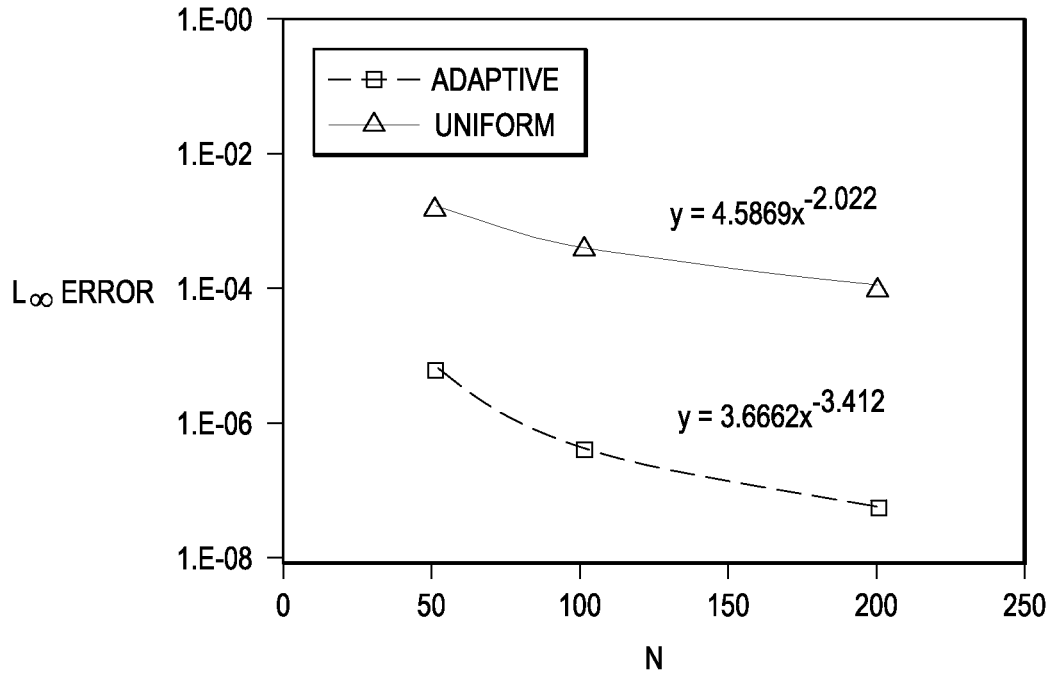
FIG. 10B is a plot showing error norms for the curves shown in FIG. 9.

FIG. 10A and FIG. 10B show the errors for examples of uniform and adaptive node distributions. In plot 1000a, the error norm $L_2$ is plotted versus the number of nodes for the results shown previously in FIG. 9. FIGS. 10A and 10B also show an exponential fit (and associated parameters) for each plotted curve. Here, the error norm $L_2$ is described by:

$$L_2 = \frac{1}{N}\sqrt{\sum_{i=1}^{N}(u_{computed,i} - u_{exact,i})^2}. \quad (24)$$

In plot 1000b, the error norm $L_\infty$ is plotted versus the number of nodes for the results shown previously in FIG. 9. Here, the error norm $L_\infty$ is described by:

$$L_\infty = \text{Maximum}(|u_{computed,i} - u_{exact,i}|) \quad (25)$$

In some cases, for a uniform node distribution condition, a finite difference scheme is expected to offer second order accurate results. This behavior is observed in FIG. 10A and FIG. 10B for the simulations using a uniform node distribution. For the adaptive node distributions, it can be observed that the order of accuracy is higher than second order, showing a benefit of adaptive node distribution strategies for computer simulations.

In some examples, the main contributing terms to the truncation error when Equation (5) is negligible are given as:

$$TE_i^h = \quad (26)$$
$$-a_i\left[\frac{1}{24}f_i^{iv}h_{i-1}h_i(h_i - h_{i-1}) + \frac{1}{120}f_i^{v}h_{i-1}h_i(h_i^2 + h_{i-1}^2 - h_{i-1}h_i)\right] +$$
$$\partial\left[\frac{1}{60}f_i^{v}(h_i^2 + h_{i-1}^2)(h_i - h_{i-1}) +\right.$$
$$\left.\frac{1}{360}f_i^{vi}(h_i^4 + h_{i-1}^4 + h_i^2 h_{i-1}^2 - h_i^3 h_{i-1} - h_{i-1}^3 h_i)\right].$$

Equation (26) has terms that are $3^{rd}$ and $4^{th}$ order in node spacing. Thus, the maximum expected accuracy can be $3^{rd}$ order. However, the $[\frac{1}{24}f_i^{iv}h_{i-1}h_i(h_i-h_{i-1})]$ and $[\frac{1}{60}f_i^{v}(h_i^2+h_{i-1}^2)(h_i-h_{i-1})]$ terms tend to be smaller for smooth meshes. Thus, the convergence can rise to $4^{th}$ order, and the adaptive mesh strategy can provide accuracy between $3^{rd}$ and $4^{th}$ order in some examples.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A fluid flow modeling method comprising: accessing, at a computer system, truncation error threshold data for a one-dimensional flow model, the one-dimensional flow model including nodes representing locations along a flow path for well system fluid in a subterranean region, the truncation error threshold data indicating a truncation error threshold value for each of the nodes;
   accessing, at the computer system, discretization data for the one-dimensional flow model, the discretization data indicating, for each of the nodes, a lowest-order term truncated from a discretized governing flow equation for the node; and
   computing, by operation of the computer system, locations for the nodes based on a scalar cost function, such that each of the lowest order terms is less than or equal to the truncation error threshold value for the respective node, thereby improving efficiency of the computer system by eliminating unnecessary use of resources of the computer system wherein the scalar cost function is defined based on a length of the flow path and a sum of distance s between pairs of the nodes and locations of the nodes are based on the scalar cost function according to an iterative root-finding algorithm wherein on each iteration of the root-finding algorithm:
   an estimated spacing for a first pair of the nodes is obtained;
   spacings for all other adjacent pairs of the nodes based on the estimated spacing for the first pair are computed, such that the lowest order terms are less than or equal to the truncation error threshold value for each respective node; and
   a new estimate for the first pair of the nodes is computed based on the scalar cost function.

2. The method of claim 1, wherein the lowest-order term includes a third-order term from a finite difference approximation of a governing flow equation.

3. The method of claim 1, comprising adjusting, within the truncation error threshold value for each of the nodes, an actual truncation error associated with discretizing the governing flow equation for the node.

4. The method of claim 1, wherein the scalar cost function comprises a single scalar cost function for computing locations for all the nodes on the flow path such that each of the lowest order terms is less than or equal to the truncation error threshold value for the respective node.

5. The method of claim 1, further comprising operating the flow model based on the computed locations for the nodes.

6. The method of claim 1, further comprising discretizing the governing flow equations and obtaining the lowest-order term for each node.

7. A non-transitory computer-readable medium storing instructions that, when executed by data processing apparatus, perform operations comprising:
   receiving truncation error threshold data for a one-dimensional flow model, the one-dimensional flow model including nodes representing locations along a flow path for well system fluid in a subterranean region, the truncation error threshold data indicating a truncation error threshold value for each of the nodes;
   receiving discretization data for the one-dimensional flow model, the discretization data indicating, for each of the nodes, a lowest-order term truncated from a discretized governing flow equation for the node; and
   computing locations for the nodes based on a scalar cost function, such that each of the lowest order terms is less than or equal to the truncation error threshold value for the respective node, thereby improving efficiency of the data processing apparatus by eliminating unnecessary use of resources of the data processing apparatus wherein locations of the nodes are based on the scalar cost function according to an iterative root-finding algorithm
   wherein on each iteration of the root-finding algorithm;
   an estimated spacing for a first pair of the nodes is obtained;
   spacings for all other pairs of the nodes based on the estimated spacing for the first pair are computed, such that the lowest order terms are less than or equal to the truncation error threshold value for each respective node; and a new estimate for the first pair of the nodes is computed based on the scalar cost function.

8. The computer-readable medium of claim 7, wherein the scalar cost function is described by:

$$F(h_0) = \Sigma h_i - L = 0$$

where $h_0$ represents a spacing between a first pair of the nodes, $h_i$ represents a spacing between the $i^{th}$ pair of nodes, and L represents the length of the flowpath.

9. The computer-readable medium of claim 7, wherein the improved estimate $h^{n+1}{}_0$ for iteration number (n+1) based on the improved estimate $h^n{}_0$ for iteration number n according to:

$$h_0^{n+1} = h_0^n - \frac{F(h_0^n)}{\frac{\partial \Sigma h_i}{\partial h_0}} \text{ where } \frac{\partial \Sigma h_i}{\partial h_0} = 1 + \sum_1^{N-1} \frac{\partial h_i}{\partial h_0},$$

where $h_0$ represents a spacing between a first pair of the nodes, $h_i$ represents a spacing between the $i^{th}$ pair of nodes, N represents the number of nodes, and $F(h^n{}_0)$ represents the scalar cost function.

10. The computer-readable medium of claim 7, wherein the lowest-order term includes a third-order term from a finite difference approximation of a governing flow equation.

11. The computer-readable medium of claim 7, the operations comprising maximizing, within the truncation error threshold value for each of the nodes, an actual truncation error associated with discretizing the governing flow equation for the node.

12. The computer-readable medium of claim 7, wherein the scalar cost function comprises a single scalar cost function for computing locations for all the nodes on the flow path such that each of the lowest order terms is less than or equal to the truncation error threshold value for the respective node.

13. A fluid flow modeling system comprising one or more computers that include:

flow model data associated with a one-dimensional flow model for well system fluid, the one-dimensional flow model including nodes representing points along a flow path, the one-dimensional flow model including governing flow equations discretized for each of the nodes; and a grid-generation module operable to:

obtain truncation error threshold data indicating a truncation error threshold value for each of the nodes;

obtain discretization data indicating, for each of the nodes, a lowest-order term truncated from a discretized governing flow equation for the node; and use a scalar cost function to compute locations for the nodes, such that each of the lowest order terms is less than or equal to the truncation error threshold value for the respective node, thereby improving efficiency of the one or more computers by eliminating unnecessary use of resources of the one or more computers wherein the scalar cost function is defined based on a length of the flow path and a sum of distances between pairs of the nodes and locations of the nodes are based on the scalar cost function according to an iterative root finding algorithm wherein on each iteration of the root-finding algorithm:

an estimated spacing for a first pair of the nodes is obtained:

spacings for all other pairs of the nodes based on the estimated spacing for the first pair are computed, such that the lowest order terms are less than or equal to the truncation error threshold value for each respective node; and a new estimate for the first pair of the nodes is computed based on the scalar cost function, wherein the improved estimate is provided as an initial estimate for each subsequent iteration until the root-finding algorithm terminates.

14. The system of claim 13, the grid-generating module being operable to maximize, within the truncation error threshold value for each of the nodes, an actual truncation error associated with discretizing the governing flow equation for the node.

15. The system of claim 13, wherein the scalar cost function comprises a single scalar cost function for computing locations for all the nodes on the flow path such that each of the lowest order terms is less than or equal to the truncation error threshold value for the respective node.

* * * * *

UNITED STATES PATENT AND TRADEMARK OFFICE
CERTIFICATE OF CORRECTION

PATENT NO. : 10,366,185 B2
APPLICATION NO. : 14/011546
DATED : July 30, 2019
INVENTOR(S) : Avi Lin and Dinesh Ananda Shetty Page 1 of 1

It is certified that error appears in the above-identified patent and that said Letters Patent is hereby corrected as shown below:

In the Claims

In Claim 1, Column 20, Line 9, delete "distance s" and insert --distances--

Signed and Sealed this
Fifteenth Day of October, 2019

Andrei Iancu
*Director of the United States Patent and Trademark Office*